3,355,325
BATTERY PLATE MANUFACTURE
Edwin J. McHenry, Millington, N.J., assignor to Bell Telephone Laboratories, Incorporated, New York, N.Y., a corporation of New York
No Drawing. Filed July 12, 1965, Ser. No. 471,442
1 Claim. (Cl. 136—24)

This invention relates to nickel cadmium cells and specifically to the fabrication of cadmium electrode plates useful in such cells.

The conventional method for making cadmium battery plates involves the impregnation of a nickel sinter with the active material, cadmium oxide or cadmium hydroxide. On charging, the cadmium hydroxide is converted to cadmium metal. The electrode reaction is:

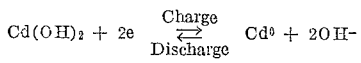

$$Cd(OH)_2 + 2e \underset{\text{Discharge}}{\overset{\text{Charge}}{\rightleftarrows}} Cd^0 + 2OH^-$$

The active paste is obtained by chemical or electrolytic precipitation of the insoluble hydroxide within the porous nickel sinter.

This method of battery plate manufacture seems to be a carry-over from the technology of lead acid cells. Among the earliest battery plates used in accumulators was the Planté plate which was simply a plate composed of the metal of the electrochemical couple, in this case lead. The effective surface area of the lead plate was increased by cycling the plate in acid sulfate. However, in the early years of development of the Planté electrode the electric power for cycling the electrodes had to be obtained from other electrolytic cells. Power generators were yet to be developed. Consequently, this process was unattractive and a method was sought whereby a large effective electrode area could be developed more directly. The result was the Faure or pasted plate. Here the active material, in the form of a paste of the lead salt, was applied directly to a rigid electrode skeleton. It was quickly realized that this was a more effective method of obtaining a larger plate capacity than was usually obtained with the Planté electrodes and did not require extensive electrical treatment. The Faure plate was very successful and continued development of this type of plate construction over the years left Planté electrodes a distant second choice even though the historical obstacle has long since been removed. By the time alkaline cells became of interest the pasted plate was clearly dominant in the battery technology. It is understandable, therefore, that most of the research and development of the more modern alkaline cells such as nickel-silver and nickel-cadmium is oriented almost entirely toward electrodes impregnated with the active metal salt and that almost all commercial alkaline cells employ what might be considered, in this context, to be Faure-type electrodes.

However, since the active material of the negative electrode in the nickel-cadmium cell is metallic cadmium, in the charged condition, there have been limited efforts to construct electrode plates of cadmium metal in much the same manner as Planté plates were made. Again, the principal problem is to obtain a large active surface area to volume ratio. Once this is achieved the plate must be further evaluated to insure that the active area is preserved during prolonged use since continual cycling of the electrode changes the distribution of the cadmium metal over the surface. Some methods of construction, while achieving a large initial porosity, produce plates which as a result of redistribution of metal tend to clog during use with a resulting decrease in capacity.

Cadmium sinters have been tried but where the sinter is sufficiently porous it corrodes through, and disintegrates. The use of a supporting structure for sintered cadmium will help. However, the tendency of the cadmium to flake off leaving the bare superstructure increases the likelihood of hydrogen evolution, aside from reducing the plate capacity.

The use of metallic cadmium was also the basis of a proposal to electroplate cadmium onto a porous electrode support structure such as a nickel sinter. This approach was found unsatisfactory due to the inability to obtain a uniform cadmium coating throughout much of the porous sinter. The electrodeposit characteristically builds up on the surface portions, where the geometry dictates the highest current density, and destroys the porosity.

This invention is directed to a method for forming a metallic cadmium electrode which avoids many of the foregoing difficulties and produces a durable electrode of high capacity and long useful life. Essentially it involves the coating of a nickel sinter under prescribed conditions to obtain a porous cadmium surface and activating the metal by cycling in alkali. Under the conditions prescribed the cadmium thoroughly wets the nickel sinter and a surprising amount of the original porosity of the nickel sinter is retained. Furthermore, the cadmium penetrates well into the pores of the sinter and the coating has a large cadmium surface area and a relatively uniform thickness.

The following is an illustrative embodiment of the invention.

A sintered nickel plaque of conventional construction is placed in a reducing furnace and heated to a temperature of at least 700° C. for a period of at least ten minutes. The plaque should have a porosity of at least 70 percent to be effective. It is important that the plaque be free of organic or similar contaminants prior to the reducing treatment since these may not be effectively removed. The reducing step primarily succeeds in reducing surface oxides which have formed on the plaque during prior processing. The reducing gas is preferably hydrogen or a hydrogen gas mixture such as forming gas.

The clean plaque is cooled in the reducing atmosphere to a temperature below 321° C., the melting point of cadmium. The plaque is covered with a thin sheet of cadmium foil. The specific thickness of the foil depends upon the amount of cadmium desired per unit volume of the plaque. For instance, a 0.11 mm. thick foil applied to a plaque having a thickness of 0.70 mm. (approximately 1.4 gm. cadmium/cm.$^3$ of plaque) is sufficient to produce an electrode having a theoretical capacity of 0.300 AH/cm.$^3$. Therefore, a reasonable requirement is that the foil have a thickness of at least 10 percent of the effective (porous) thickness of the plaque. Alternatively, the cadmium can be applied in powder form although the use of the foil obviously is more convenient, particularly from the point of view of the ease in reliably applying a uniform density of metal over the plaque surface. Also the application of metal powder to the plaque while in the furnace creates obvious difficulties due to the thermal convection currents, and surface oxides formed in the hot environment are considerably more troublesome with the powder due to the large specific surface area. The presence of oxides makes the wetting of the nickel sinter less effective. Consequently, the use of the foil is preferred.

The plaque, with the overlying cadmium, is heated to a temperature above 321° C. to impregnate the nickel sinter with molten cadmium. It is preferable to keep the temperature below 500° C. to avoid alloying of the cadmium with the nickel sinter. The range 350° C. to 400° C. is convenient. The plaque is then cooled to room temperature. The entire operation should be done in a reducing atmosphere and is most conveniently accomplished in the original hydrogen furnace. Deviation from this procedure increases the likelihood of failure due to nonwetting of the nickel by the molten cadmium. A plaque with exposed nickel is undesirable since it permits gassing of hydrogen from the bare nickel surface even before the available cadmium is used up. The evolution of significant quantities of hydrogen will invariably cause a sealed nickel-cadmium cell to fail, occasionally with violent rupture.

The product of this impregnation procedure then requires an activation step to further increase the effective active surface area of the electrode. This is done by alternately corroding the cadmium metal electrolytically in hydroxide solution and reducing the resultant cadmium hydroxide back to cadmium metal. This general approach is not unlike that which was practiced on Planté-type electrodes and is generally known in the art as "forming" as applied to plaques of this type. Similar cycling steps are customarily included in manufacturing conventional-type plates. In view of this, the specific details of the forming step are not relied on for patentability. However, the use of a forming step as an essential operation in combination with the novel process for fabricating cadmium plates in accordance with the teachings of this invention is considered as part of the patentable process. Consequently the following specific embodiment of one exemplary forming operation is described.

The nickel sinter, impregnated with molten cadmium according to the foregoing teachings, is placed in an electrolytic cell containing 30 percent KOH and two nickel counter electrodes are placed on either side of the cadmium plate to insure even current distribution during the forming step. With the cadmium plate as anode, current is passed at the rate of 15 ma./in.$^2$ of apparent surface area for a period of ten hours. The current is then reversed and the plate is charged at 50 ma./in.$^2$ of apparent surface area. When all of the available cadmium has been reduced to the metallic state vigorous evolution of hydrogen gas will be observed at the cadmium electrode. The cadmium electrode is allowed to overcharge for about one hour after hydrogen evolution. This cycle is repeated five times to fully activate the electrode.

Several alternatives to this specific example are within the skill of the art. For the purposes of this invention the term "forming" adequately describes the essential operation and is intended to define electrolytic cycling in alkali metal hydroxide. Obviously other hydroxides can be substituted for potassium hydroxide.

Various additional modifications and extensions of this invention will become apparent to those skilled in the art. All such variations and deviations which basically rely on the teachings through which this invention has advanced the art are properly considered within the spirit and scope of this invention.

What is claimed is:

A method for the fabrication of cadmium battery plates for use in nickel-cadmium alkaline cells comprising the steps of heating a porous nickel sinter plaque having a porosity of at least 70 percent in a reducing atmosphere at a temperature of at least 700° C. for a period of at least ten minutes, reducing the temperature of the nickel sinter plaque to below 321° C., applying a thin cadmium foil to the surface of the nickel sinter plaque, heating the plaque and the foil to a temperature in excess of 321° C. whereby the cadmium melts, wets the nickel and is distributed throughout the porous sinter plaque, and cooling the impregnated sinter plaque, all of the foregoing steps being conducted in a reducing atmosphere, and thereafter forming the cadmium-impregnated plaque by electrolytically cycling the plaque in a solution of an alkali metal hydroxide.

References Cited

UNITED STATES PATENTS

| | | | |
|---|---|---|---|
| 3,076,860 | 2/1963 | Dickfeldt | 136—24 |
| 3,284,237 | 11/1966 | Lambert et al. | 136—24 |

WINSTON A. DOUGLAS, *Primary Examiner.*

C. F. LeFEVOUR, *Assistant Examiner.*